July 15, 1924.  
G. E. NOFFSINGER  
1,501,682  
COMBINATION WHEEL PULLER, TOOL GRINDER, AND POWER DEVICE  
Filed Nov. 28, 1922  
2 Sheets-Sheet 1
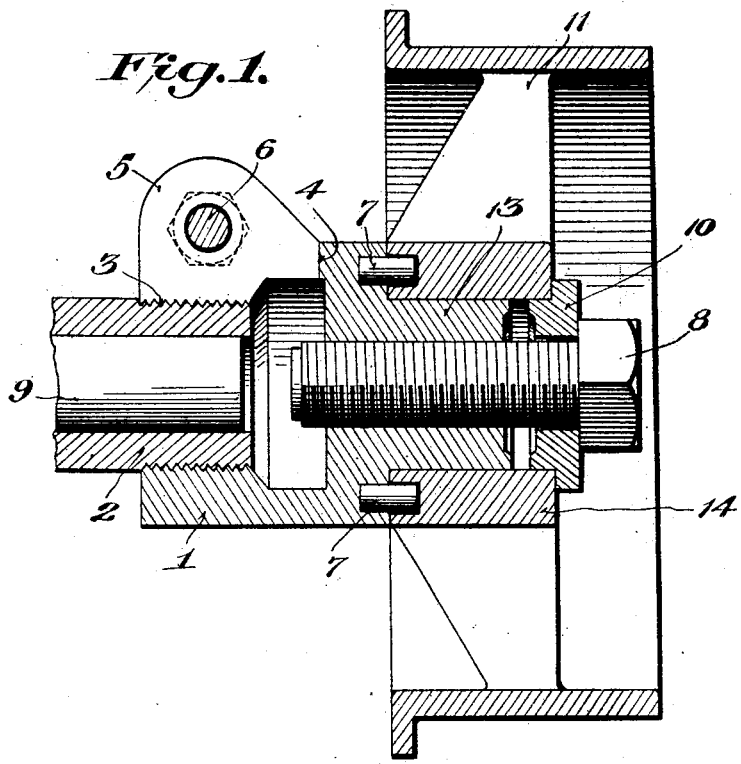
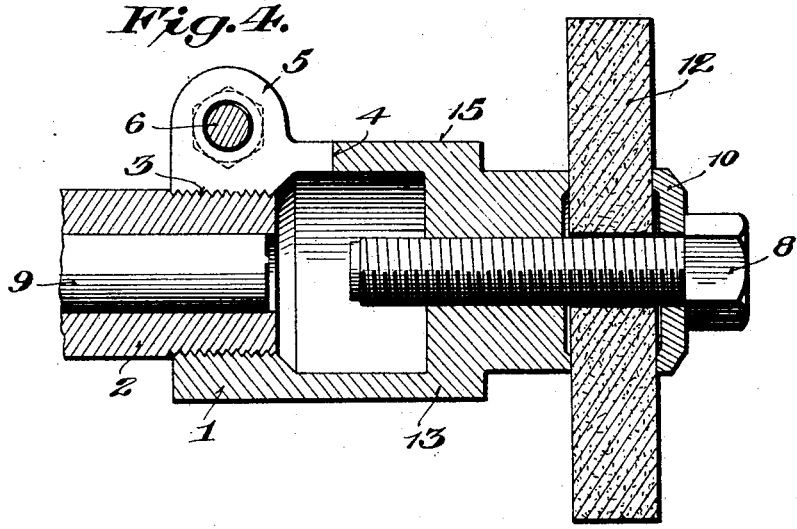
Inventor  
George E. Noffsinger,  
By Daniel Stryker  
his Attorney July 15, 1924.
G. E. NOFFSINGER
1,501,682
COMBINATION WHEEL PULLER, TOOL GRINDER, AND POWER DEVICE
Filed Nov. 28, 1922     2 Sheets-Sheet 2
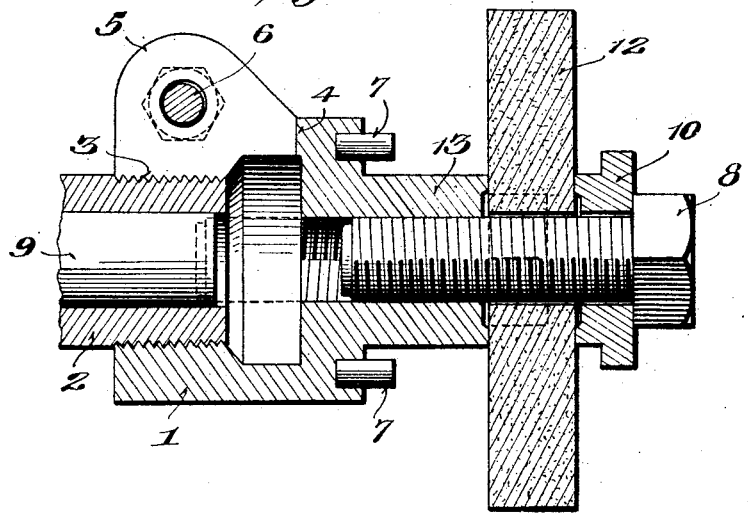
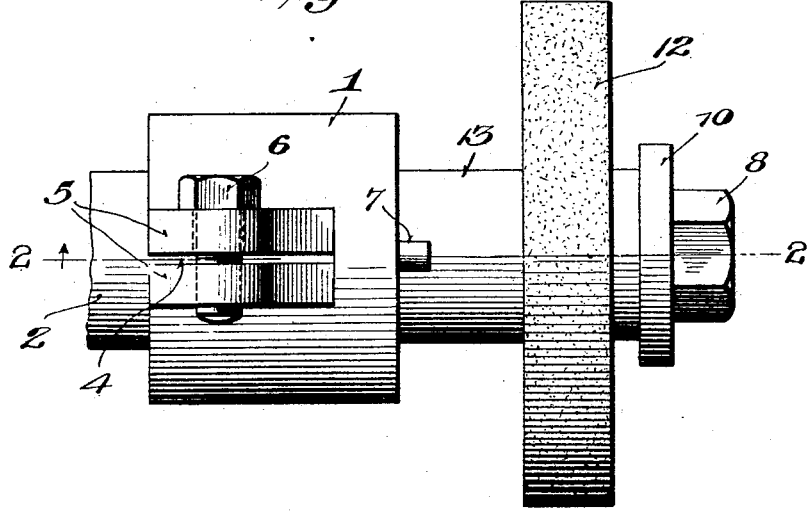
Inventor
George E. Noffsinger;
By Daniel Stryker,
his Attorney Patented July 15, 1924.

1,501,682

UNITED STATES PATENT OFFICE.

GEORGE E. NOFFSINGER, OF ELKHART, INDIANA.

COMBINATION WHEEL PULLER, TOOL GRINDER, AND POWER DEVICE.

Application filed November 28, 1922. Serial No. 603,823.

*To all whom it may concern:*

Be it known that I, GEORGE E. NOFFSINGER, a citizen of the United States, residing at Elkhart, in the county of Elkhart and State of Indiana, have invented certain new and useful Improvements in a Combination Wheel Puller, Tool Grinder, and Power Device, of which the following is a specification.

My invention relates to improvements in stripping devices for use in removing wheels or other rotors from axles or shafts. More particularly my invention consists in a stripping device or wheel puller which is adapted to receive a pulley or other work performing rotor so that power may be derived from a revolving wheel when the device is applied to its hub.

One object of my invention is to provide a wheel puller capable of being converted into a power transmitting mechanism.

Another object is to construct such a combination tool so that the power transmitting element may be detached when the device is intended to be used as a wheel puller.

Another object of my invention is to construct a wheel puller which is adapted to receive a variety of different power transmitting elements depending upon the one chosen.

A still further object of my invention is to provide a device which is simple to assemble, efficient in use and easy and inexpensive to manufacture.

Prior to the conception of my invention wheel pullers capable of being used on axles as power transmitting devices were known. In these the power transmitting element, however, was not separate from the wheel puller proper and consequently such devices were of limited use as power transmitting mechanisms. Furthermore, the wheel puller was then necessarily bulky and clumsy and consequently difficult to use as a wheel puller. To overcome these and other disadvantages existing in the prior art this invention was conceived.

My improved wheel puller has the conventional hub gripping member and also a screw which makes threaded engagement with that member. This screw serves to bear against the end of the axle when the device is used as a wheel puller, but when it is desired to have a power transmitting device the screw is used to secure the power transmitting or work performing element to the wheel puller.

The specific arrangements chosen to illustrate my invention are more clearly set forth in the accompanying drawings.

Figure 1 is a sectional view of my improved wheel puller showing a pulley attached;

Fig. 2 is a like view of the wheel puller, with an emery wheel in position, being a cross-section of Fig. 3 on the line 2—2;

Fig. 3 shows a top view of the wheel puller of Fig. 2; and

Fig. 4 represents in section another form of my wheel puller with an emery wheel attached.

Referring to the drawings, in Fig. 1, 1 represents the collar of the wheel puller which is intended to grip the hub 2 of a wheel by means of the threaded portion 3. This collar is split as at 4. On each side of the split the collar is formed into lugs 5 which are connected by a screw 6 by the tightening of which the size of the collar may be slightly reduced or caused to more firmly grip the hub after the collar is screwed on.

Dowel pins 7 project from the wheel puller to hold in place any of the several detachable elements designed to fit on it. Other devices may be mounted on the wheel puller such as rotary saws, grindstones, etc., the pulley shown in Fig. 1 being used merely by way of illustration. The screw 8 is threaded to engage the main body 13 of the wheel puller. When the device is to be used as a wheel puller the screw 8 is caused to bear against the end of the axle 9 thus pulling off the wheel. At such a time the position shown in dotted lines in Fig. 2 is assumed by the screw. Further, it will be observed that the screw 8 has, of necessity, a length greater than the distance from the outside end of the member 13 to the end of the axle of the driving wheel to enable the screw to effect pressure against the end of the axle. Also, the diameter of the screw 8 must be smaller than the diameter of the exposed end of the axle to permit the wheel to pass freely over it when the wheel is being pulled off. When it is desired to use the device as a power transmitting or work performing mechanism, the screw cooperates with a washer 10 or with this washer and the dowel pins 7 to hold the detachable work performing or power transmitting element rigidly in place.

In Fig. 1 is shown a pulley 11 designed to fit on the wheel puller. This pulley is partly hollow to lighten it and lessen its cost. This also permits the use of a short screw 8 which is more convenient than a longer one would be when using the device as a wheel puller. The hub 14 of the pulley 11 is made of such a size as to just fit over the body portion 13 of the wheel puller. Recesses are provided in this hub to accommodate the dowel pins 7 which aid in holding the pulley rigid as set forth above.

In Fig. 2 an emery wheel or small grindstone 12 is shown attached to the wheel puller. It is held rigidly in place between the surfaces of the body 13 and the washer 10 by means of the screw 8.

Fig. 4 represents an alternate form of my improved combination tool. In this form the surface 15 of the main body portion of the wheel puller serves as a power transmitting surface making a detachable pulley unnecessary. Like the form shown in Figs. 1, 2 and 3, provision is made for attaching other work performing elements to the wheel puller. An emery wheel or grindstone 12 constitutes such an element in Fig. 4.

Of course other work performing or power transmitting elements than those shown in the drawings may be used with the wheel puller. The emery wheel and pulley have been selected merely by way of example. The arrangement of the parts of my improved combination tool makes apparent the many uses to which it may be put and its consequent advantages.

It should be understood that I do not limit my invention to the particular forms shown since various modifications thereof will suggest themselves to those skilled in the art without departing from the spirit of my invention, the scope of which is defined by the annexed claims.

What I claim as new and desire to protect by Letters Patent is:

1. A power transmitting mechanism comprising one member having means for fixedly mounting the same upon the hub of a driving wheel, dowel pins projecting from said member, a second member adapted to make threaded engagement with said first member, and a power pulley adapted to be rigidly fixed to said first member by means of said dowel pins and said second member.

2. A power transmitting mechanism, comprising one member having means for fixedly mounting the same upon the hub of a driving wheel, a second member adapted to make threaded engagement with said first member, a power pulley adapted to be rigidly fixed to said first member by means of said second member, and means associated with said first member for preventing rotation of said pulley with respect to said first member.

3. A power transmitting mechanism, comprising one member having means for fixedly mounting the same upon the hub of a driving wheel, a second member adapted to make threaded engagement with said first member, a work performing rotor adapted to be rigidly fixed to said first member by means of said second member, and means associated with said first member for preventing rotation of said rotor with respect to said first member.

4. A power transmitting mechanism comprising a member having means for fixedly mounting the same upon the hub of a driving wheel, a power transmitting element adapted to fit on said member, and means for fixing said power transmitting element against longitudinal and rotational movement with respect to said member.

5. A power transmitting mechanism, comprising one member having means for fixedly mounting the same upon the hub of a driving wheel, a screw adapted to make threaded engagement with said member and having a length greater than the distance from the outside end of said member to the end of the axle of the driving wheel, and a work performing rotor adapted to be rigidly fixed to said first member by means of said screw.

6. A power transmitting mechanism, comprising one member having means for fixedly mounting the same upon the hub of a driving wheel, a screw adapted to make threaded engagement with said member and having a length greater than the distance from the outside end of said member to the end of the axle of the driving wheel and a diameter less than the diameter of the exposed end of the axle, and a work performing rotor adapted to be rigidly fixed to said first member by means of said screw.

In testimony whereof I affix my signature.

GEORGE E. NOFFSINGER.